(12) United States Patent
Freeberg et al.

(10) Patent No.: US 6,386,566 B1
(45) Date of Patent: May 14, 2002

(54) FREEWHEELING DRIVE HAVING FORWARD, REVERSE AND BRAKING CAPABILITY

(75) Inventors: John G. Freeberg, Escondido; Robert C. Luikart; Robert F. Luikart, both of Ramona, all of CA (US)

(73) Assignee: Progress Place, L.L.C., Escondido, CA (US)

( * ) Notice: Subject to any disclaimer, the term of this patent is extended or adjusted under 35 U.S.C. 154(b) by 0 days.

(21) Appl. No.: 09/825,674

(22) Filed: Apr. 3, 2001

(51) Int. Cl.[7] .................. B62M 25/00; B62M 1/02; B60K 41/26; B62L 5/00
(52) U.S. Cl. ............... 280/237; 280/259; 192/217.2; 192/217.6; 188/24.17
(58) Field of Search ................. 280/282, 236, 280/237, 264, 259; 192/217.2, 217.6; 188/24.17, 26

(56) References Cited

U.S. PATENT DOCUMENTS

| | | | | | |
|---|---|---|---|---|---|
| 2,091,586 A | * | 8/1937 | Glacy | ...................... | 192/217.6 |
| 2,113,177 A | * | 4/1938 | Glacy | ...................... | 192/217.2 |
| 2,246,191 A | * | 6/1941 | Schmitz | ................... | 192/217.2 |
| 5,027,930 A | | 7/1991 | Reed | .......................... | 192/6 R |
| 5,570,760 A | * | 11/1996 | Lai | .............................. | 188/26 |
| 5,657,836 A | * | 8/1997 | Bevier | ..................... | 188/24.17 |
| 5,669,467 A | * | 9/1997 | Chiang | .................... | 188/24.12 |
| 6,283,486 B1 | * | 9/2001 | Huang | ..................... | 192/217.2 |

* cited by examiner

Primary Examiner—Brian L. Johnson
Assistant Examiner—Matt Luby
(74) Attorney, Agent, or Firm—Joseph W. Holland

(57) ABSTRACT

A drive system for a velocipede, such as a tricycle, which includes forward and reverse pedaling capabilities as well as coasting and braking capabilities.

2 Claims, 6 Drawing Sheets

FREEWHEELING DRIVE HAVING FORWARD, REVERSE AND BRAKING CAPABILITY

BACKGROUND OF THE INVENTION

1. Technical Field

This invention generally relates to pedal powered wheeled vehicles, or velocipedes. More particularly, this invention relates to a direct drive system having coaster brake functionality with the additional ability to be pedaled in reverse.

2. Background

Likely, the very first pedal powered velocipede employed a direct drive mechanism consisting of an axle having a pair of opposing crank arms, including attached pedals, extending radially out from the ends of the axle to convert reciprocal pedaling motion to rotational motive force. This drive system is characteristic of Penny Farthings, old fashioned high wheel bicycles, and is still commonly found on current day tricycles and unicycles. The direct couple between the pedals and wheel allows a user to pedal in both forward and backward directions and to apply braking resistance to the pedals to slow and stop the vehicle. However, it does not allow the user to coast, i.e. freewheel or stop their pedaling motion while the wheel is still turning, without removing their feet from the pedals.

Reed, U.S. Pat. No. 5,027,930, teaches a direct drive system for velocipedes which includes a coaster brake and coasting functionality. The details of the Reed system will be addressed and explained in more detail later in this disclosure. The Reed system does not allow reverse pedaling. The drive wheel of Reed can only be reversed when no pressure is applied to the pedals. While the reverse function may be less desirable in bicycles, it is very important to tricycle riders as tricycles are more cumbersome to navigate.

The system disclosed in the Reed patent has a drive shaft or crankshaft rotatably supported within a freewheeling hub. A clutch positioned around the crankshaft axially translates along the crank shaft between a drive engagement position and a braking position. The clutch can generally be described as a sleeve which includes internal threads that engage external threads formed on the crankshaft. Rotation of the crankshaft in one direction translates the clutch toward a first end of the crankshaft while rotation of the crankshaft in the other direction causes the clutch to translate toward the second end of the crankshaft. The clutch includes one or more tapered surfaces for engaging either a tapered flange formed on the internal surface of the hub or brake shoes. A braking cone rotatably supports the second end of the crankshaft and is fixed with respect thereto by a brake reaction lever, which in turn is affixed to a stationary point such as the velocipede's frame. Additionally, the braking cone supports one end of the brake shoes. When the clutch is translated toward the brake shoes, one of the tapered surfaces on the clutch forces the free ends of the brake shoes out toward the internal surface of the hub, eventually stopping the hub. When the clutch is translated the other direction, a tapered surface frictionally engages the tapered flange to couple the drive shaft to the hub and drive rotation of the wheel. Other embodiments of the Reed device replace the drive function of the clutch with a one way coupler, such as a "Torrington" roller bearing, between the hub and the drive shaft. This couple allows freewheeling rotation of the crank shaft in the braking direction but couples the shaft to the hub when the crankshaft is rotated in the drive direction.

What is needed is a freewheeling direct drive system which allows forward drive rotation, coasting, braking and reverse drive rotation.

SUMMARY OF THE INVENTION

One embodiment of the invention provides a freewheeling drive system for a velocipede such as a tricycle. The velocipede is of the general type propelled by directly driving a front wheel via pedals. A wheel hub on the front wheel is mounted on a crankshaft or driveshaft. The ends of the driveshaft have a pair of crank arms radially extending therefrom. Pedals are connected to each crank arm. The drive shaft is mounted on a pair of bearing assemblies supported by front forks of the velocipede.

The drive system is assembled within the wheel hub and works as follows.

When the crank arms are turned in a clockwise direction as viewed from the right side of the velocipede, the drive shaft rotates to drive wheel in the same direction, thereby driving the velocipede forward. When the crank arms rotate at a slower speed relative to the wheel hub or cease rotation, the wheel hub continues to rotate about the driveshaft, which is now stationary. The velocipede is now coasting under its own inertia. When the crank arms are turned in the reverse direction, the components of the drive system within the wheel hub operate to slow or to brake wheel from further forward rotation. Additional reverse rotation of the crank arms result in reverse rotation of the driveshaft, wheel hub and wheel.

The drive system is similar to that found in a traditional coaster brake, single speed bicycle with the major exception being that the brake reaction lever is replaced by a multi-component one-way bearing assembly. This bearing assembly, in connection with other more standard coaster drive components, allows forward pedal drive, coasting, braking and reverse pedal drive.

Additional advantages and novel features of the invention will be set forth in part in the description that follows, and in part will become apparent to those skilled in the art upon examination of the following or may be learned by practice of the invention.

DETAILED DESCRIPTION OF THE INVENTION

Figure 1:
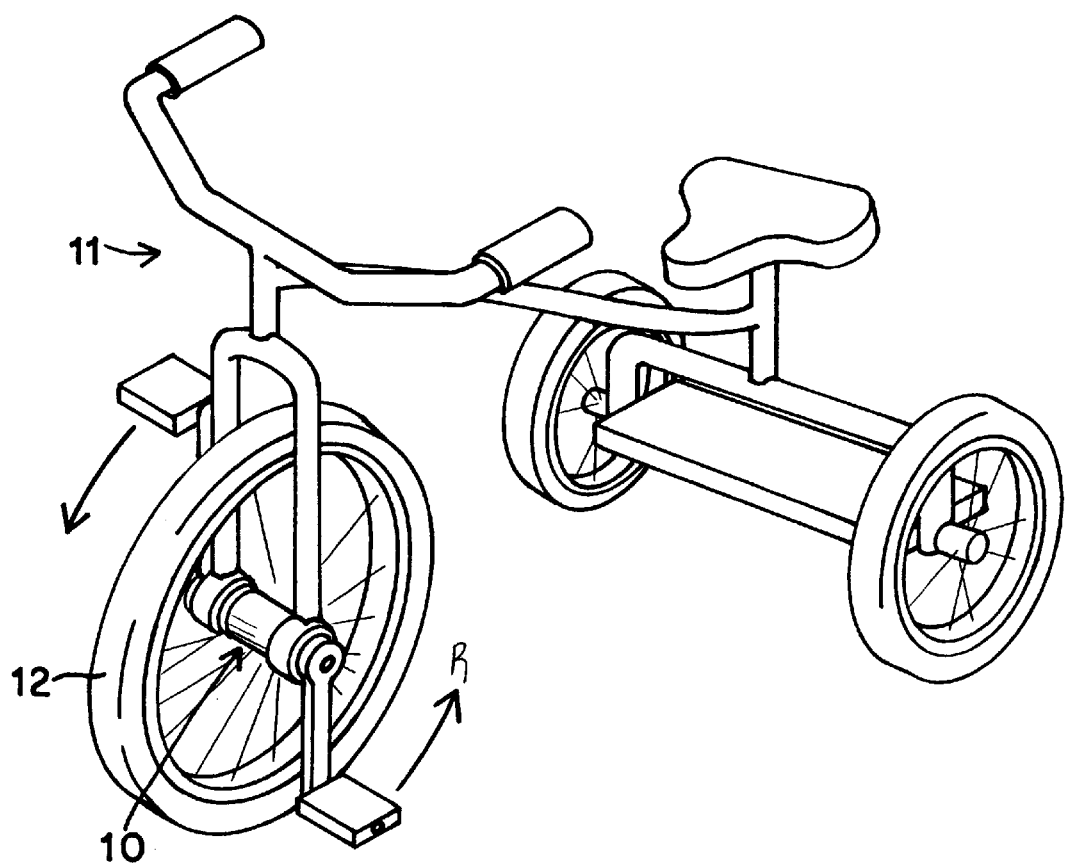
FIG. 1 is a perspective view of a tricycle having a drive system according to one embodiment of the invention.

Referring to FIG. 1, a freewheeling drive system 10, according to one embodiment of the invention, is installed within a velocipede 11. Velocipede 11, here a tricycle, is of the general type propelled by directly driving a front wheel 12 via pedals. Tricycle 11 includes a seat supported by a frame and two rear wheels. A handle bar assembly is rotatably attached to the frame.

Figure 2:
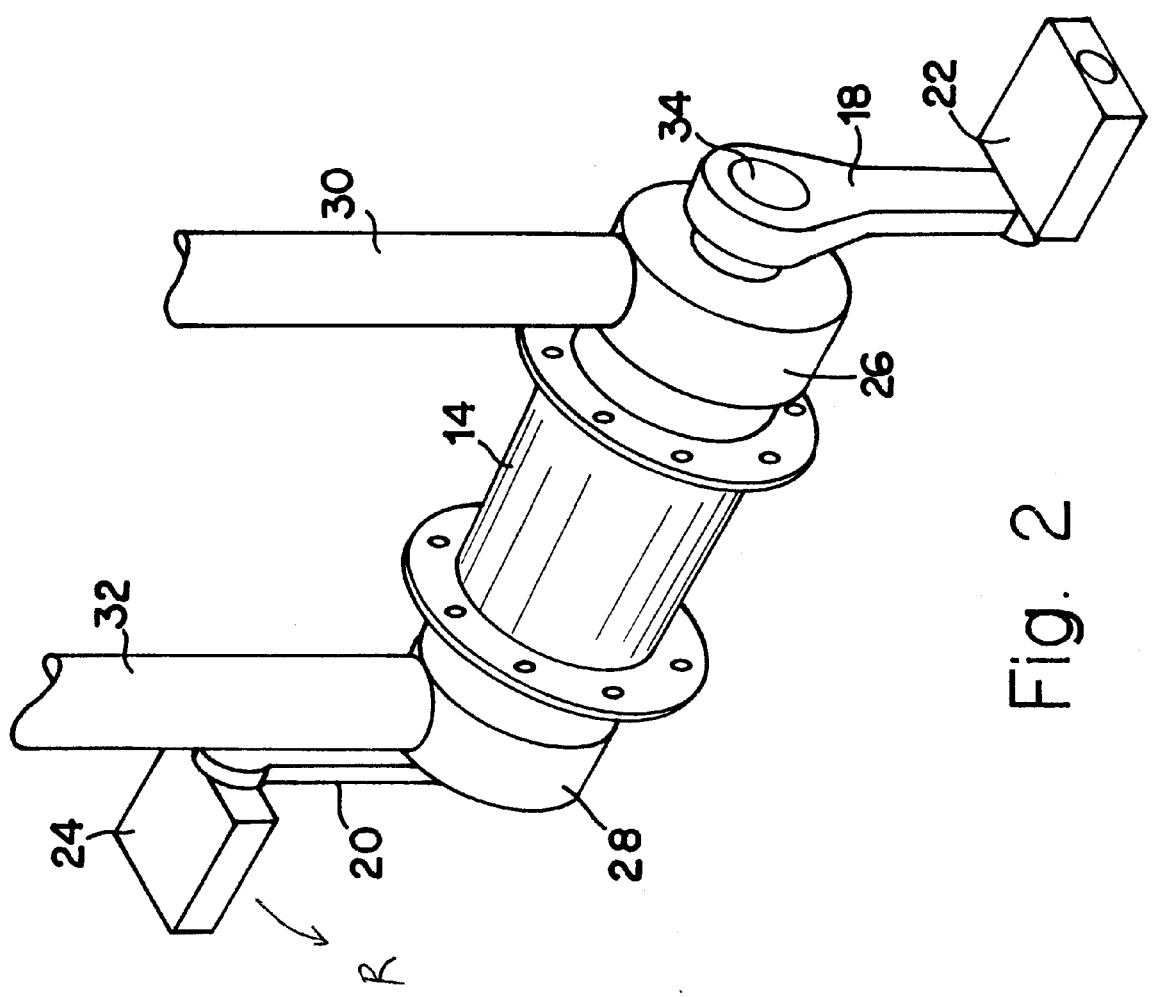
FIG. 2 is a detail view of a wheel hub according to one embodiment of the invention.

Referring to FIG. 2, wheel hub 14 of front wheel 12 is shown mounted on driveshaft 34. The ends of driveshaft 34 have crank arms 18 and 20 radially extending therefrom. Pedals 22 and 24 are connected, each to one of crank arms 18 and 20. Driveshaft 34 is mounted on bearing assemblies 26 and 28, which are supported by [front] forks 30 and 32.

The general operation of the velocipede is as follows. When crank arms 18 and 20 are turned in a direction R as shown by the arrows in FIG. 1, driveshaft 34 rotates to drive wheel 12 in the same direction, thereby driving velocipede 11 forward. Referring to FIG. 2, when crank arms 18 and 20 rotate at a slower speed relative to wheel hub 14 or cease rotation, i.e., are stationary with respect to forks 30 and 32, wheel hub 14 continues to rotate about driveshaft 34, which is now stationary. Velocipede 11 is now coasting under its own inertia. When crank arms 18 and 20 are turned in the reverse direction, the components of drive system 10 within wheel hub 14 operate to slow or to brake wheel 12 from further forward rotation. Additional reverse rotation of crank arms 18 and 20 results in reverse rotation of driveshaft 34, wheel hub 14 and wheel 12.

Figure 3:
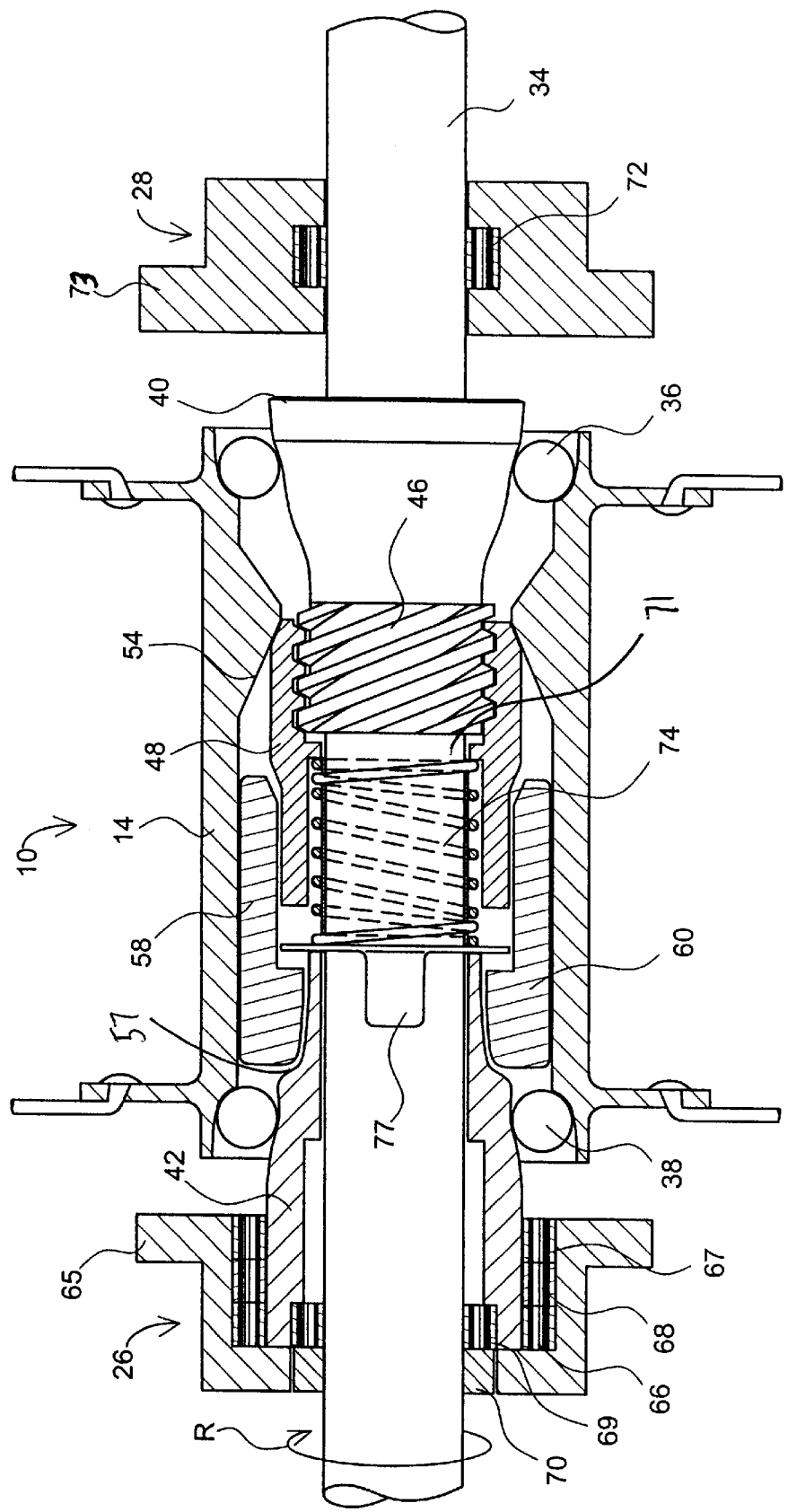
FIG. 3 is a side partial sectional view of one embodiment of the invention.
Figure 4:
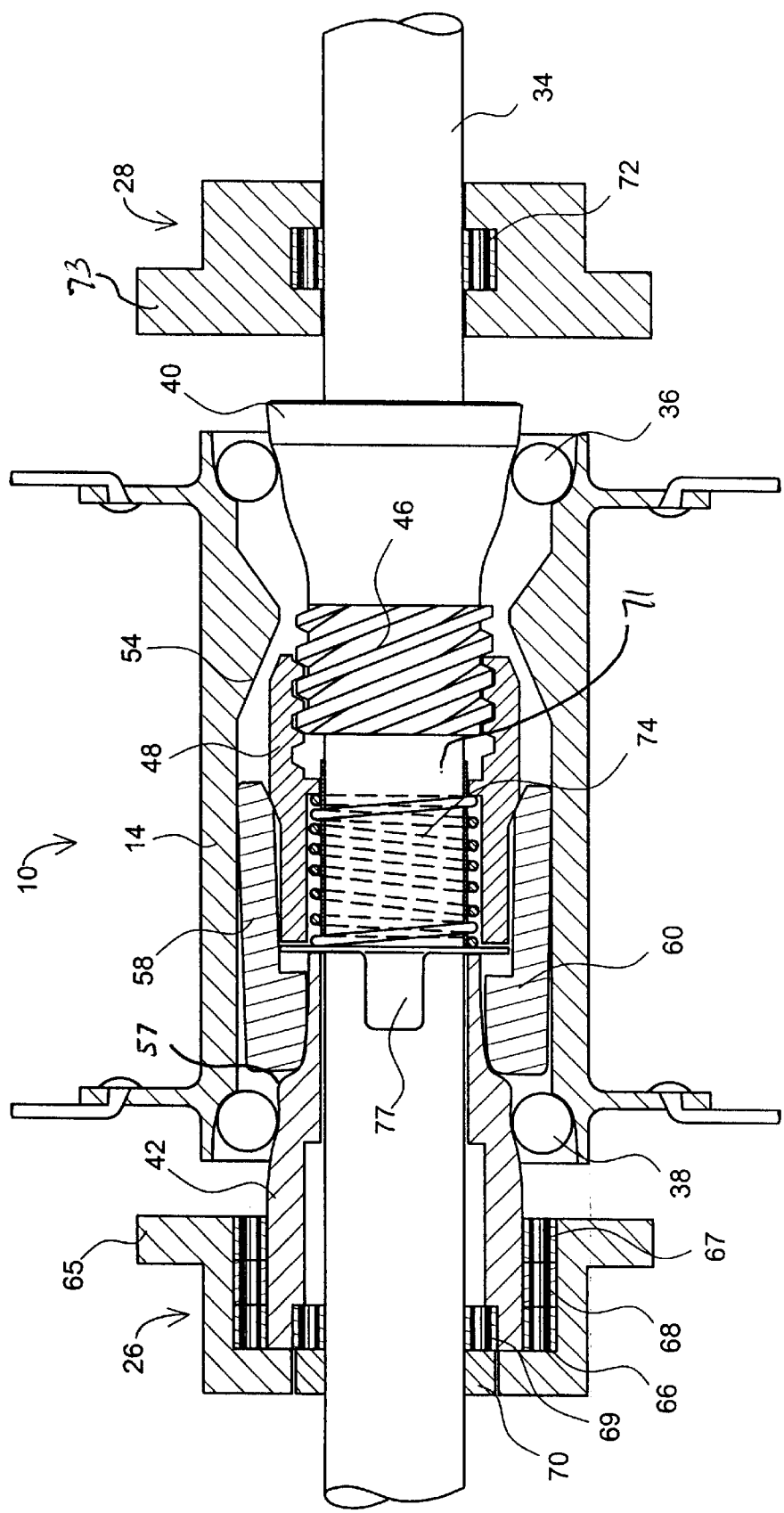
FIG. 4 is a side partial sectional view of one embodiment of the invention.

Referring to FIGS. 3 and 4, drive system 10 is assembled within wheel hub 14. Wheel hub 14 here has a cylindrical wall rotatably mounted on driveshaft 34, which is in turn supported by bearing assemblies 26 and 28. Bearing assemblies 26 and 28 are secured to forks 30 and 32. At one end of wheel hub 14, a bearing 36 is provided between wheel hub 14 and an enlarged portion 40 of driveshaft 34. At the other end of wheel hub 14, a bearing 38 is provided between a brake hub 42 and the wheel hub 14. Brake hub 42 has an axial bore through which driveshaft 34 is free to rotate.

Figure 5A:
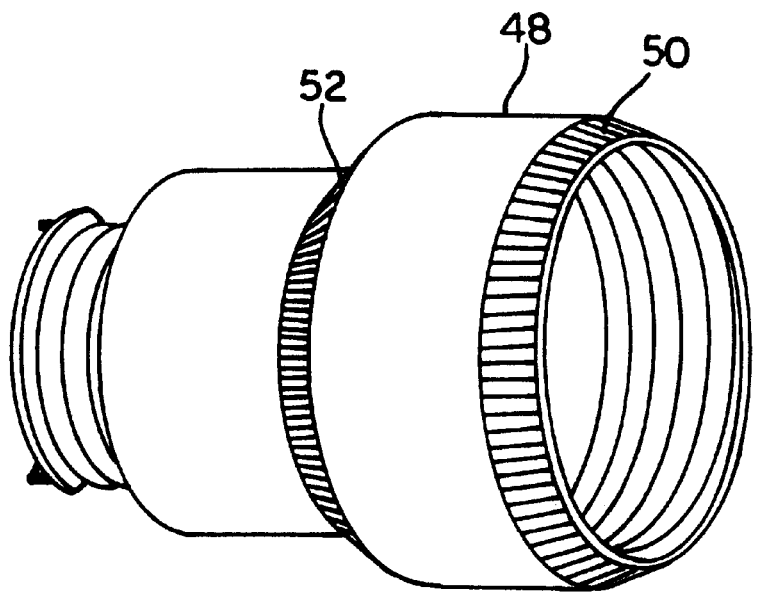
FIG. 5A is a first end perspective view of a drive bushing according to one embodiment of the invention.
Figure 5B:
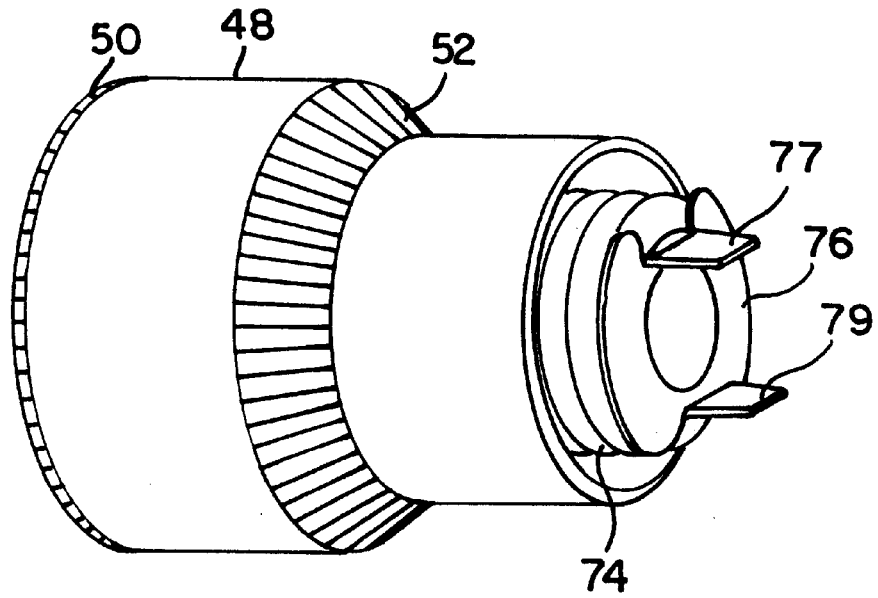
FIG. 5B is a second end perspective view of a drive bushing according to one embodiment of the invention.
Figure 6:
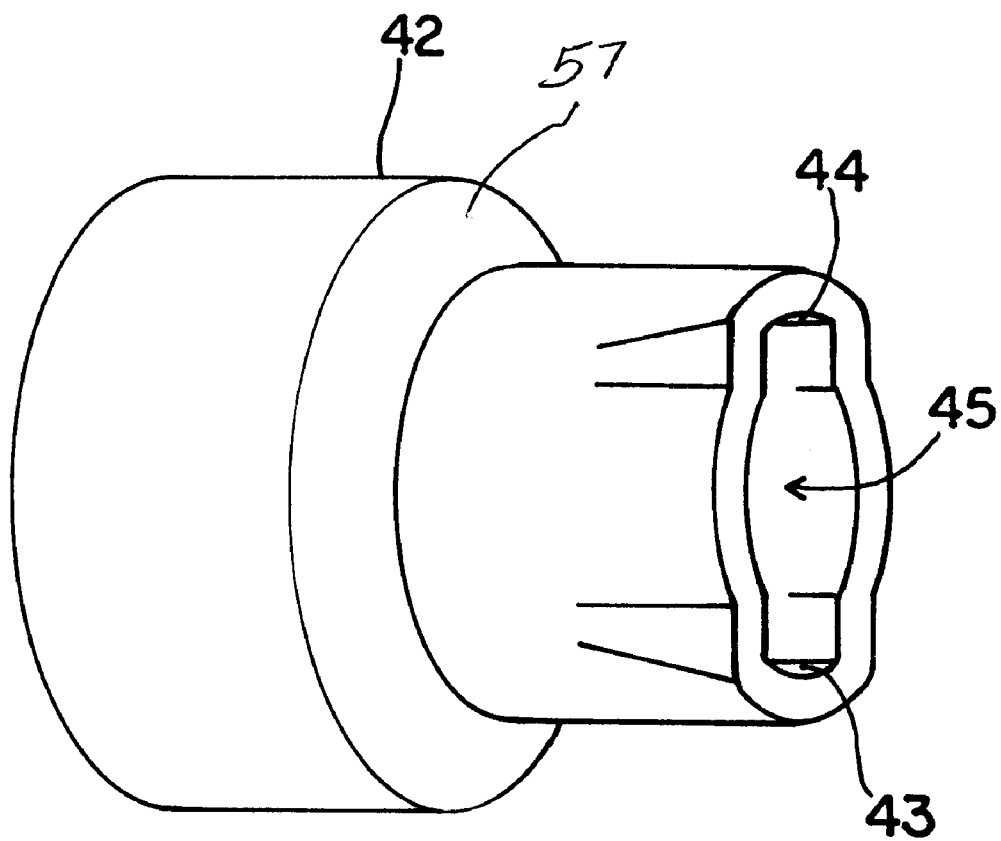
FIG. 6 is a first end perspective view of a brake hub according to one embodiment of the invention.

Brake hub 42 is provided with alternating tapered surface 57, as shown in FIG. 6, and tab receiving channels 43 and 44 at one end. The other end of the brake hub 42 is rotatably supported by bearing assembly 26. Referring particularly to FIGS. 5A through 6, tabs 77 and 79 of spring retainer 76 slidably fit into channels 43 and 44 around a circular shaft hole 45 in brake hub 42. This ensures the spring retainer 76 rotates with brake hub 42.

As shown in FIGS. 3 and 4, bearing assembly 26 has a flanged race retaining collar 65 for retaining bearing 38, first free wheel bearing 66, second free wheel bearing 67 and one way roller bearing 68. The orientation of one way roller bearing 68 is such that it prevents rotation of driveshaft 34, with respect to brake hub 42, in the direction of rotation R as shown in FIGS. 1 and 3. Hence, when wheel 12 is pedaled forward, brake hub 42 and driveshaft 34 are essentially locked together and brake hub 42 rotates with wheel 12. During braking, one way roller bearing 68 provides the brake reactionary force which, in the prior art, has previously been provided by a brake reaction lever secured to the velocipede frame.

As shown in FIGS. 3 and 4, bearing assembly 26 supports brake hub 42 on driveshaft 34. Here, bearing assembly 26 has a free roller bearing 69 secured within an internal race in the end of brake hub 42. A set screw collar 70 keeps roller bearing 69 in place along driveshaft 34. Bearing assembly 28 has a flanged race retaining collar 73 housing a free roller bearing 72 which in turn receives and supports driveshaft 34.

Driveshaft 34 includes a driver 46, either formed integrally therewith or affixed thereto, which is provided with a helical thread. Slidably mounted along driveshaft 34 and adjacent driver 46 is a drive bushing 48 which is provided with an internal threaded surface for threaded engagement with driver 46. The direction of the thread is such that when driveshaft 34 is rotated in the direction of rotation R as shown in FIGS. 1 and 3, drive bushing 48 is threaded onto driver 46.

As shown in FIGS. 5A and 5B, drive bushing 48 is generally cylindrical having tapered surfaces 50 and 52. Tapered surface 50 is configured to frictionally engage a flange 54, shown in FIGS. 3 and 4, formed on the internal cylindrical wall of wheel hub 14 for coupling the rotation of driveshaft 34 to wheel hub 14 to drive wheel 12 forward. Tapered surface 50 may be roughened or knurled to increase friction between drive bushing 48 and flange 54.

A pair of brake shoes 58 and 60 are disposed circumferentially around tapered surface 57 of the brake hub 42, in the space defined by tapered surface 52 of the drive bushing 48 and the inside wall of wheel hub 14. Each of the brake shoes may be provided with a convex surface shaped to engage the inside wall of wheel hub 14 for braking. The ends of brake shoes 58 and 60 advantageously are shaped to engage the tapered surface 52 of drive bushing 48 and tapered surface 57 of brake hub 42. When driveshaft 34 is rotated in the reverse direction, the axial re-positioning of drive bushing 48 causes brake shoes 58 and 60 to slide along the tapered surface 50 of drive bushing 48 and tapered surface 57 of brake hub 42 to create a camming action and forcing the brake shoes 58 and 60 outward against the inside wall of hub 14, as is shown in FIG. 4.

A helical spring 74 is disposed along driveshaft 34, between drive bushing 48 and brake hub 42. Spring 74 is fitted over a cylindrical spring retainer 71 which has tabs 77 and 79 (shown in FIG. 5B) provided at its end adjacent to brake hub 42. Tabs 77 and 79 (shown in FIG. 5B) fit in channels 43 and 44 (shown in FIG. 6). The other end of spring 74 rests against an internal flange within drive bushing 48. Spring 74 urges drive busing 48 toward driver 46 and applies rotational resistance to drive bushing 48 to resist motion while it threads on or off the driver 46 as driveshaft 34 rotates, thereby facilitating the threading action of drive bushing 48 with respect to driver 46. Spring 74 however allows drive busing 48 to rotate slightly against the torsion of the spring to ensure that drive bushing 48 is disengaged from the flange 54 during coasting, braking and reverse pedaling, as explained below.

The components of drive system 10 within the hub 14 may be protected from dust by dust caps provided at the ends of hub 14.

In the operation of drive system 10 according to this embodiment of the invention, rotation of driveshaft 34, by crank arms 18 and 20 in the forward driving direction, causes the drive bushing 48 to thread itself onto the threads of driver 46. Spring 74 facilitates the threading action as it urges drive bushing 48 toward driver 46 and deters drive bushing 48 from rotating with driver 46. Drive bushing 48 thus traverses axially toward flange 54, and frictionally engages flange 54 thereby coupling the rotary motion of driveshaft 34 to hub 14 so as to drive hub 14 to rotate in the same direction as driveshaft 34. FIG. 3 shows drive bushing 48 in the forward driving position where the brake shoes 58 and 60 are disengaged from the inside wall of hub 32.

When the rotation of driveshaft 34 is stopped or slowed, hub 14 continues to rotate in the forward driving direction as a result of its inertia and the inertia of velocipede 10. Friction between the tapered surface 50 and flange 54 causes drive bushing 48 to rotate slightly with respect to the slowed or stopped driveshaft 34, which in turn causes drive bushing 48 to unthread slightly from driver 46, thereby disengaging the drive bushing 48 from the flange 54. Hub 14 is now decoupled from driveshaft 34 and will continue to rotate independently of driveshaft 34.

To brake or slow the rotation of hub 14, driveshaft 34 is rotated in a reverse direction to arrow R. This causes drive bushing 48 to unthread further from driver 46 against the urging of spring 74 and traverse toward brake hub 42. Brake shoes 58 and 60 engage brake hub 42 tapered surface 57 and drive bushing 48 tapered surface 52. This creates a camming action between the brake shoes 58 and 60 and the brake hub 42 tapered surface 57 and drive bushing 48 tapered surface 52, thus causing brake shoes 58 and 60 to move radially outward toward the inside wall of hub 14. The outside surfaces of the brake shoes 58 and 60 frictionally engage the inside wall of hub 14 to retard and finally stop the rotation of hub 14.

Another embodiment of the invention enables the invention to be retrofitted to a standard coaster brake drive mechanism assembly to facilitate economical manufacture. Specifically, the standard brake hub and brake reaction lever assembly are replaced by the brake hub and bearing assembly according to the invention, as described earlier.

While there are shown and described certain embodiments of the invention, it is to be distinctly understood that this invention is not limited thereto but may be variously embodied to practice within the scope of the following claims.

We claim:

1. A drive system residing within a wheel hub for a velocipede which comprises:

a drive shaft including crank arms extending radially there from, the drive shaft being rotatably supportable within the hub by bearing assemblies and including an external threaded portion for threadedly engaging a drive bushing;

the drive bushing being sized and shaped to transverse the drive shaft as a result of threaded engagement with the drive shaft;

a brake shoe sized and shaped to frictionally engage the wheel hub upon urging by the drive bushing and resistance by a brake hub; and the brake hub rotatably supporting the drive shaft by a bearing assembly which includes a one-way bearing which couples the brake hub to the drive shaft when the drive shaft is rotated in one direction and decouples the brake hub from the drive shaft when the drive shaft is rotated in an opposite direction.

2. The system of claim 1 further comprising a spring positioned between the drive bushing and the brake hub to bias the drive bushing toward an end of the drive shaft opposite the brake hub.

* * * * *

UNITED STATES PATENT AND TRADEMARK OFFICE
CERTIFICATE OF CORRECTION

PATENT NO.     : 6,386,566 B1
DATED          : May 14, 2002
INVENTOR(S)    : Freeberg et al.

It is certified that error appears in the above-identified patent and that said Letters Patent is hereby corrected as shown below:

Column 3,
Line 4, "[front] fork" should read -- forks --

Column 4,
Line 36, "drive busing" should read -- drive bushing --

Signed and Sealed this

Sixteenth Day of July, 2002

Attest:

JAMES E. ROGAN
Attesting Officer    Director of the United States Patent and Trademark Office